(12) United States Patent
Jayavant

(10) Patent No.: US 6,718,439 B1
(45) Date of Patent: Apr. 6, 2004

(54) CACHE MEMORY AND METHOD OF OPERATION

(75) Inventor: Rajeev Jayavant, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 139 days.

(21) Appl. No.: 09/872,313

(22) Filed: Jun. 1, 2001

(51) Int. Cl.$^7$ .............................................. G06F 12/00
(52) U.S. Cl. ...................... 711/136; 711/128; 711/144
(58) Field of Search ................................ 711/128, 118, 711/136, 144, 145

(56) References Cited

U.S. PATENT DOCUMENTS

2002/0133672 A1 * 9/2002 Van De Waerdt et al. .. 711/128
2003/0014594 A1 * 1/2003 Krimer et al. ............... 711/128

FOREIGN PATENT DOCUMENTS

JP 07-334423 * 12/1995

OTHER PUBLICATIONS

"Way–Predicting Set–Associative Cache for High Performance and Low Energy Consumption," by Koji Inoue, Tohru Ishihara and Kazuaki Murakami, Department of Computer Science and Communication Engineering Kyushu University, pp. 273–275.

* cited by examiner

Primary Examiner—David L. Robertson

(57) ABSTRACT

An N-way set associative virtual victim cache in which cache accesses are automatically directed only to the data array in the most recently used way. The cache memory comprises: 1) N ways, each of the N ways comprising a data array capable of storing L cache lines and a tag array capable of storing L address tags, each of the L address tags associated with one of the L cache lines; and 2) address decoding circuitry capable of receiving an incoming memory address and accessing a target cache line corresponding to the incoming memory address only in a most recently used one of the N ways.

27 Claims, 3 Drawing Sheets

CACHE MEMORY AND METHOD OF OPERATION

TECHNICAL FIELD OF THE INVENTION

The present invention is generally directed to cache memories and, in particular, to a virtual victim cache for use in a processor core.

BACKGROUND OF THE INVENTION

It is essential that a microprocessor executes instructions in the minimum amount of time. Many technologies—quite often relying on radically different approaches—have been developed to increase microprocessor speeds. One approach is to increase the speed of the clock that drives the processor. As the clock rate increases, however, the power consumption and temperature of the processor also increase. Also, processor clock speeds may not increase beyond a threshold physical speed. As a result, there is a practical maximum to the clock speed of conventional processors.

An alternate approach to improving processor speeds is to reduce the number of clock cycles required to perform a given instruction. Under this approach, instructions execute faster and overall processor throughput increases even if the clock speed remains the same. One technique for increasing processor throughput is pipelining, which calls for the processor to be divided into separate processing stages. Instructions are processed in an assembly line fashion in the processing stages. Each processing stage is optimized to perform a particular processing function, thereby causing the processor as a whole to become faster.

A cache is a small, fast memory that holds a small group of instructions and data for use by a processor. The processor retrieves data and instructions from the cache memory, rather than the slower main memory, as long as the required data and instructions are in the cache memory. If a needed instruction or data value is not in the cache memory, a cache miss occurs and the instruction or data value is fetched from main memory. Processor throughput can be maximized by minimizing the cache misses (or maximizing cache hits) and minimizing cache access time.

The design of a cache memory often is a compromise between access time, hit rate, and power consumption. Direct-mapped cache memories, in which instructions or data are stored in a single storage block, have the fastest access times and relatively low power consumption. Power consumption is particularly important in system-on-a-chip devices and in battery powered systems, particularly mobile communication devices. Unfortunately, direct-=mapped caches also have the lowest hit rates (i.e., highest miss rates). N-way set associative caches, in which instructions or data are stored in one of N storage blocks (or ways), have higher hit rates, but also suffer from slower access times and higher power consumption. It is desirable to reduce the amount of compromising that is necessary in cache memory design.

Therefore, there is a need in the art for cache memories that maximize processor throughput. In particular, there is a need in the art for cache memories that have a reduced access time and low power consumption, with comparatively high hit rates. More particularly, there is a need an improved cache memory that has the speed and low power consumption of a direct-mapped cache and the high hit rate of an N-way set associative cache.

SUMMARY OF THE INVENTION

To address the above-discussed deficiencies of the prior art, it is a primary object of the present invention to provide an N-way set associative virtual victim cache in which cache accesses are automatically directed only to the data array in the most recently used way. According to an advantageous embodiment of the present invention, the cache memory comprises: 1) N ways, each of the N ways comprising a data array capable of storing L cache lines and a tag array capable of storing L address tags, each of the L address tags associated with one of the L cache lines; and 2) address decoding circuitry capable of receiving an incoming memory address and accessing a target cache line corresponding to the incoming memory address only in a most recently used one of the N ways.

According to one embodiment of the present invention, the cache memory further comprises hit determination circuitry capable of receiving the incoming memory address and accessing an address tag corresponding to the incoming memory address in each tag array in each of the N ways and determining if a cache hit occurred in one of the N ways.

According to another embodiment of the present invention, the cache memory further comprises a register capable of storing a most recently used (MRU) value identifying the most recently used way.

According to still another embodiment of the present invention, the address decoding circuitry uses the MRU value to access the target cache line in the most recently used way.

According to yet another embodiment of the present invention, the register is disposed in the address decoding circuitry.

According to a further embodiment of the present invention, the cache memory further comprises update circuitry capable of modifying the MRU value in the register in response to a determination by the hit determination circuitry that the cache hit occurred in a target one of the N ways other than the most recently used way.

According to a still further embodiment of the present invention, the update circuitry modifies the MRU value such that the MRU value identifies the target way as a new most recently used way.

According to a yet further embodiment of the present invention, the update circuitry is further capable of modifying the MRU value in response to a determination by the hit determination circuitry that a cache miss occurred.

In one embodiment of the present invention, the update circuitry modifies the MRU value after the cache miss occurred to identify a least recently used one of the N ways as a new most recently used way.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
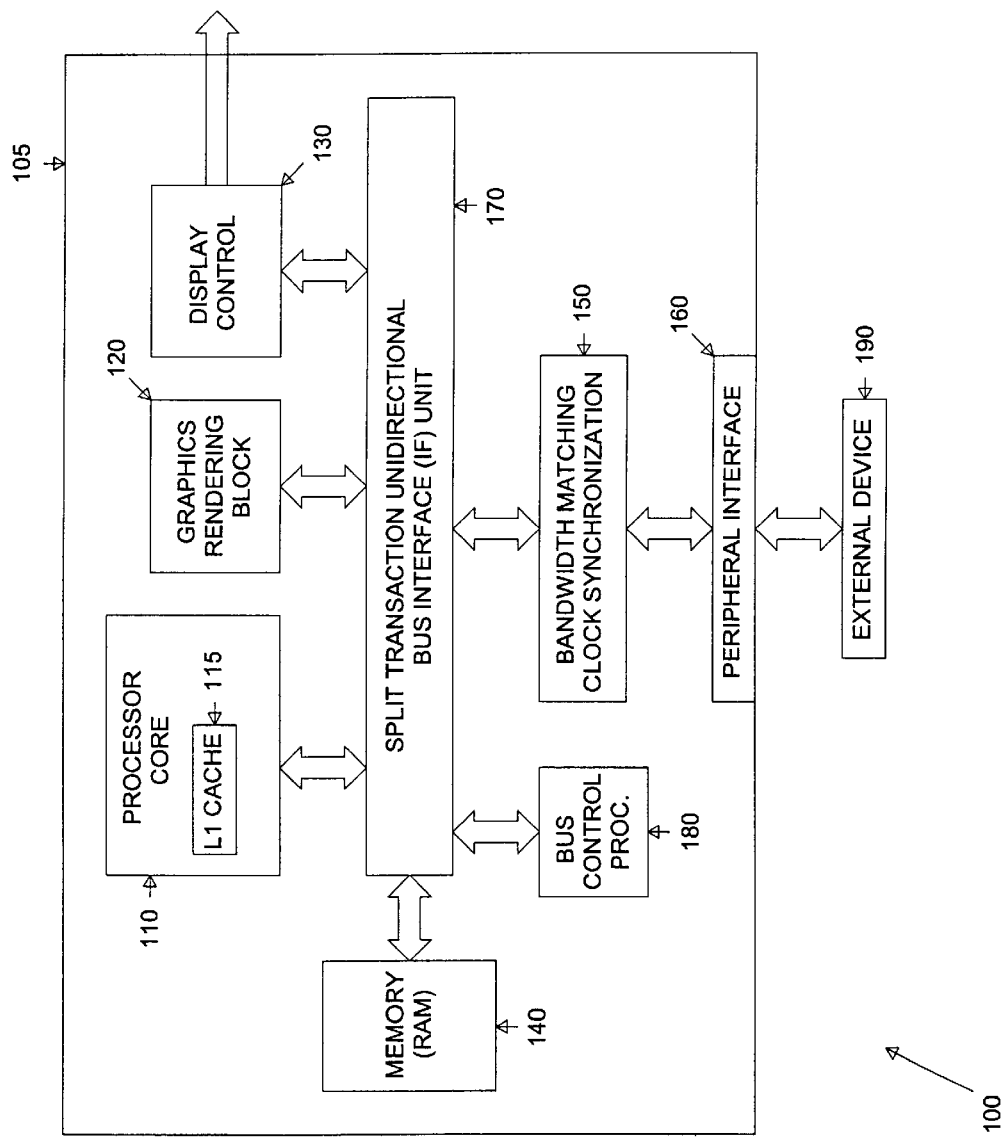
FIG. 1 illustrates a processing system which contains an exemplary system-on-a-chip (SOC) device according to one embodiment of the present invention.
Figure 2:
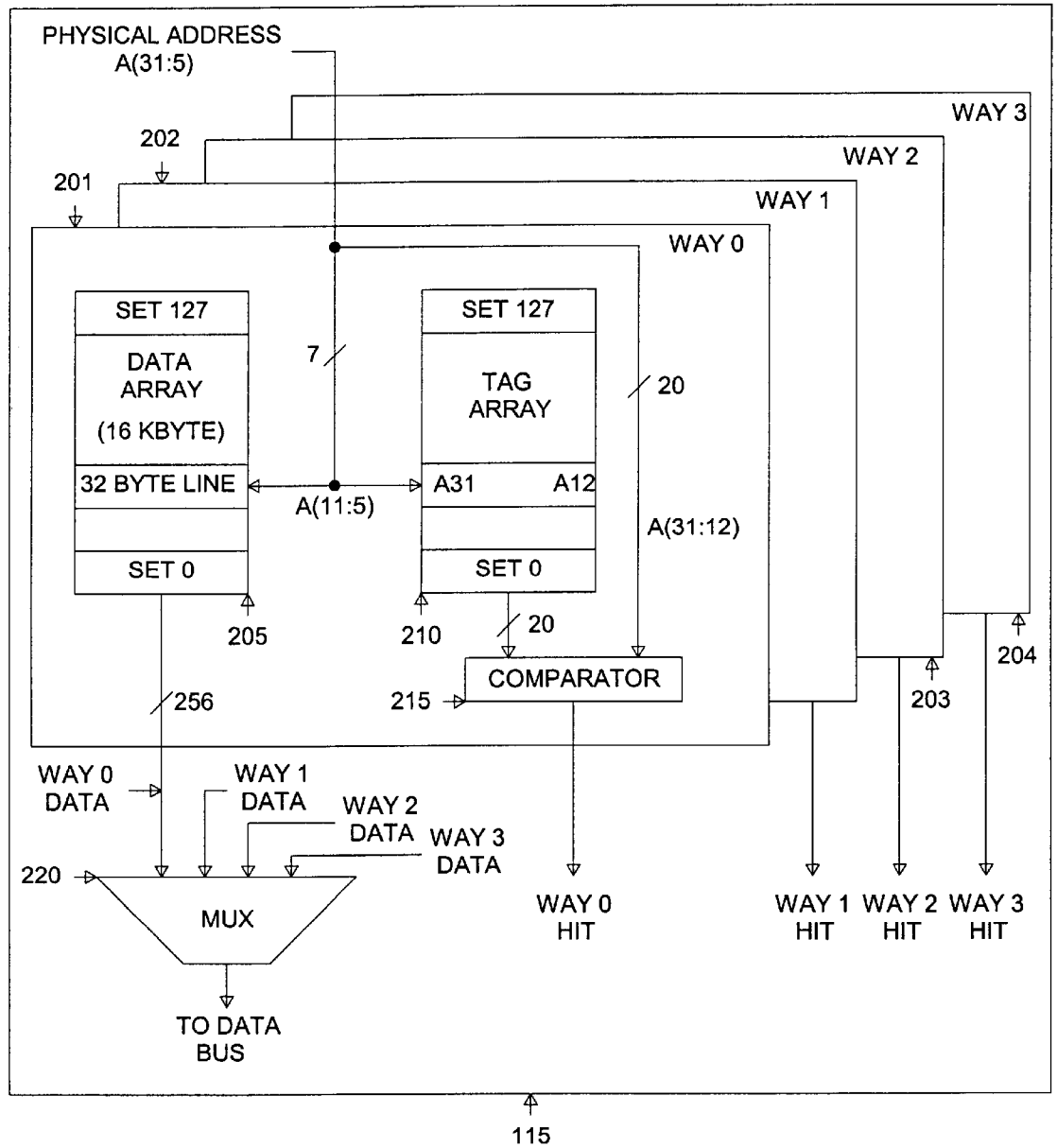
FIG. 2 depicts the exemplary L1 cache in FIG. 1 in greater detail according to one embodiment of the present invention.
Figure 3:
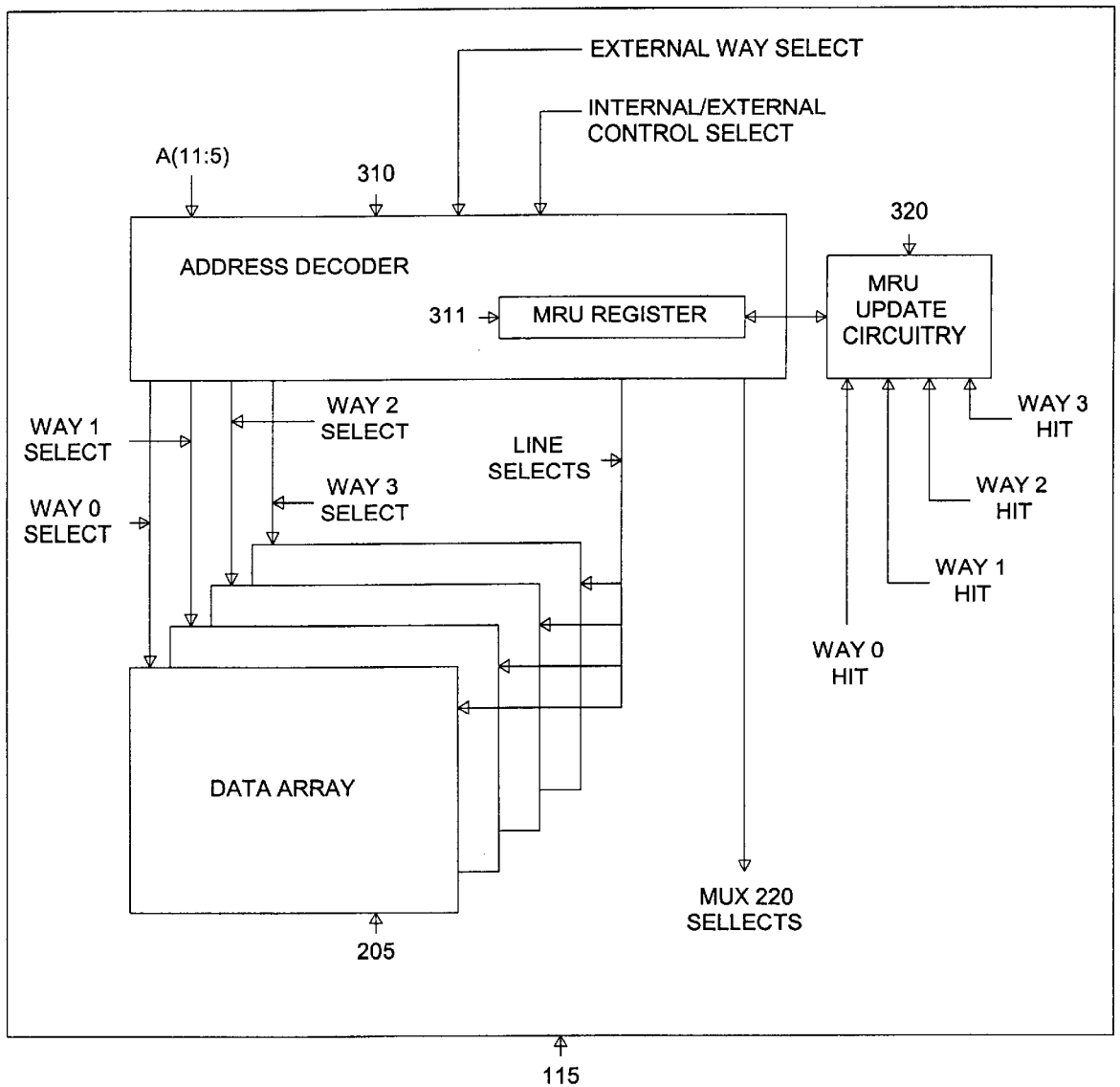
FIG. 3 depicts selected portions of the address decoding circuitry in the exemplary L1 cache according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged cache memory.

FIG. 1 illustrates processing system 100, which comprises exemplary system-on-a-chip (SOC) device 105 according to one embodiment of the present invention. SOC device 105 is a single integrated circuit comprising processor core 110, graphics rendering block 120, (optional) display control circuit 130, memory 140, bandwidth matching-clock synchronization interface 150, peripheral interface 160, split transaction, unidirectional bus interface (IF) unit 170 (or bus IF unit 170), and bus control processor 180. Processor core 110 contains internal level one (L1) cache 115. Peripheral interface 160 communicates with external device 190.

Processing system 100 is shown in a general level of detail because it is intended to represent any one of a wide variety of electronic products, particularly consumer appliances. Display controller 130 is described above as optional because not all end-products require the use of a display. Likewise, graphics rendering block 120 may also be optional.

For example, processing system 100 may be a printer rendering system for use in a conventional laser printer. Processing system 100 also may represent selected portions of the video and audio compression-decompression circuitry of a video playback system, such as a video cassette recorder or a digital versatile disk (DVD) player. In another alternative embodiment, processing system 100 may comprise selected portions of a cable television set-top box or a stereo receiver.

Bus IF unit 170 provides high-speed, low latency communication paths between the components coupled to bus IF unit 170. Each component coupled to bus IF unit 170 is capable of initiating or servicing data requests via four unidirectional bus interfaces: two request buses and a two data buses. The request bus contains address lines, byte enable lines (32-bit or 64-bit data reads), cycle type lines, and routing information for transactions. The data bus contains data lines, byte enable lines (for data writes), completion status lines, and routing information to associate the data bus packets with the appropriate request bus packet. As noted, the four buses are unidirectional and point-to-point to minimize loading and timing variations.

Bandwidth matching-clock synchronization interface 150 comprise a queue that bridges ports on bus IF unit 170 that have different widths or different frequencies, or both. Bus control processor 180 controls certain operations of bus IF unit 170 related to clock timing, power management, and diagnostic features. Peripheral interface 160 is a bus device used for chip-to-chip communication between SOC device 105 and an external peripheral device, such as external device 190.

The throughput of processor core 110 is maximized by implementing L1 cache 115. According to the principles of the present invention, L1 cache 115 is a virtual victim cache that has the fast access times of a direct-mapped cache, only slightly higher power consumption than a direct-mapped cache, and a high hit rate similar to that of an N-way set associative cache.

FIG. 2 depicts selected portions of exemplary L1 cache 115 in FIG. 1 in greater detail. According to an advantageous embodiment of the present invention, L1 cache 115 is a modified 4-way set associative cache that is logically similar to a 4 Kbyte direct-mapped ache backed by a 12 Kbyte 3-way set associative level-two (L2) victim cache. According to the principles of the present invention, tag comparisons are done in parallel in all four ways. The power consumption of the tag array circuitry is therefore the same as in a standard 4-way set associative cache and the miss penalty is the same (i.e., miss detected within one clock cycle). However, the most recently used (MRU) way is used to predictively read only a single way of the data array. For the purposes of this application and the claims herein, the term "most recently used way" means the way most recently accessed for each individual cache line by a cache access operation, whether the cache access is a read operation or a write operation. The most recently used way is selected by default because, due to the frequent repetition of instruction loops in a program, the next instruction or data to be accessed by processor core 110 from a particular address will most likely be from the same way as the last instruction or data to be accessed by processor core 110 from that particular address.

Since the cache hit status is not required to select the predicted way, the access time of the data array is basically the same as a direct-mapped cache. Advantageously, since only the cache line in the data array of the predicted way (i.e., MRU way) is read, the power consumption of the data array for a cache according to the principles of the present invention is one-fourth the power consumption for reading all four ways in a conventional 4-way set associative cache.

According to an advantageous embodiment, L1 cache 115 contains 16 Kbytes of data subdivided into 512 cache lines of 32 bytes each. L1 cache 115 is organized as 128 sets, Sets 0–127, that are divided into four ways, Ways 0–3. Blocks 201–204 in L1 cache 115 comprise Ways 0–3, respectively. Ways 1–3, shown as layered outlines, are functionally equivalent to Way 0. This being the case, only Way 0 need be discussed to explain cache hits and cache misses and the retrieval of data from L1 cache 115.

Each set consists of eight entries: an address tag and a 32-byte cache line from each of the four ways. For example, if address bits A(11:5) are 0000000, Set 0 is being addressed. In a conventional 4-way set-associative cache, corresponding 32-byte lines in data array 205 and corresponding address tags in tag array 210 in all four ways are accessed. In a virtual victim cache according to the principles of the present invention, corresponding address tags in tag array 210 in all four ways are accessed, but a corresponding 32-byte line in data array 205 is accessed only in the most recently used (MRU) way.

In an exemplary embodiment, twenty-seven physical address bits, A(31:5), are needed to fetch data from L1 cache 115. Since data are written to, and read from, L1 cache 115 in entire 32-byte cache lines, the five least significant address bits, A(4:0), are not used. Address bits A(4:0) may be used to address individual bytes within a cache line.

Address bits A(11:5) select a 32-byte line in data array 205 in the MRU array only and an address tag in tag array 210 simultaneously in each of the four ways. When a cache line is written into data array 205, the tag address A(31:12) is simultaneously stored in one of the 128 locations in tag array 210, as determined by the address bits A(11:5). Thus, when address bits A(11:5) are applied to tag array 210, the stored value of tag address A(31:12) is sent to comparator 215 for comparison with address bits A(31:12) of the current physical address. At the same time, the 32 bytes in data array 205 corresponding to address A(11:5) are accessed in the MRU way and applied to one of the channels of multiplexer 220.

A cache hit occurs if the address bits A(31:12) are the same as in the selected location in the MRU way. A cache miss occurs if a cache hit occurs in one of the ways other than the most recently used way, or if no hit occurs in any of the four ways. One (and only one) of the enable signals, WAY 0 HIT, WAY 1 HIT, WAY 2 HIT, or WAY 3 HIT, goes high for the corresponding way if a hit occurs.

FIG. 3 depicts selected portions of the decoding circuitry in exemplary L1 cache 115 according to one embodiment of the present invention. L1 cache 115 comprises address decoder 310, which contains most recently used (MRU) register 311, and most recently used (MRU) update circuitry 320. According to an exemplary embodiment of the present invention, address decoder 310 provides one of four way select signals to the data array in each of the four ways. The WAY 0 SELECT signal enables data array 205 in Way 0. The WAY 1 SELECT signal enables data array 205 in Way 1. The WAY 2 SELECT signal enables data array 205 in Way 2. Finally, The WAY 3 SELECT signal enables data array 205 in Way 3. Address decoder 310 also provides a LINE SELECT signal to each of Way 0–Way 3.

MRU register 311 determines (i.e., predicts) the way in which data array 205 is enabled. According to an advantageous embodiment of the present invention, MRU register 311 comprises a three bit value, MRU=[S2, S1, S0], for each cache line that selects one of the four data arrays and disables the others. Thus, in the exemplary embodiment, MRU register 311 contains 128 MRU values, one for each cache line, where each MRU value indicates the most recently used (i.e., accessed) way for that particular address.

For each MRU value, the S0 bit indicates whether Way 0 was the most recently used (S0=0) or Way 1 was the most recently used (S0=1). Similarly, the S1 bit indicates whether Way 2 was the most recently used (S1=0) or Way 3 was the most recently used (S1=1). Finally, the S2 bit indicates whether S1 is valid and indicates the correct most recently used way (S2=1) or S0 is valid and indicates the correct most recently used way (S2=0).

For example, if MRU register 311=[0,1,0] for cache line 25 (i.e., A(11:5)=0011001), then S2=0 indicates that S0 is valid and S0=0 indicates that Way 0 is the most recently used way for cache line 25. Therefore, the WAY 0 SELECT signal is active and data array 205 in Way 0 is enabled. As a result, the next incoming address, A(11:5)=0011001, accesses cache line 25 in Way 0 only. The sense amplifiers and other data reading circuitry in the data arrays in Way 1, Way 2, and Way 3 are disabled, thereby conserving power when the next address, A(11:5)=0011001, is decoded. The data values in Way 1, Way 2, and Way 3 are not lost, however.

In an alternate embodiment of the present invention, the most recently used way may be accessed by decoding address A(11:5) into one of 128 line selects that are applied to MRU register 311. Then, for each of the 128 line selects, MRU register 311 determines which of the four ways is the most recently used way. MRU then activates one of four line selects for that particular cache line address. Thus, MRU register 311 receives 128 line select signals and outputs 512 line select signals. Each of the 512 line select signals activates a single cache line in a single way for a read operation or a write operation.

Address decoder 310 also receives the signals EXTERNAL WAY SELECT and INTERNAL/EXTERNAL CONTROL SELECT. The EXTERNAL WAY SELECT signal is controlled by external circuitry in three situations: 1) after a cache miss, in order to load a new value into an available way; 2) after a hit in a non-MRU way; and 3) after a cache miss when no way is available, in which case the cache line that holds that latest valid data must be stored in main memory before a new value is stored in that cache line and overwrites the valid data. If any of these events occur, the INTERNAL/EXTERNAL CONTROL SELECT indicates that the EXTERNAL WAY SELECT signal is valid and external read/write control circuitry control the operation of address decoder 310. Otherwise, the INTERNAL/EXTERNAL CONTROL SELECT signal indicates that the operation of address decoder 310 is controlled by the MRU values stored in MRU register 311 for each cache line.

MRU update circuitry 320 updates the MRU values in MRU register 311 whenever there is a cache miss or whenever there is a cache hit in one of the ways other than the MRU way. MRU update circuitry 320 identifies these events by monitoring the WAY 0 HIT signal, the WAY 1 HIT signal, the WAY 2 HIT signal, and the WAY 3 HIT signal. If an incoming address A (11:5) is received and a cache hit occurs on one of the WAY 0 HIT, WAY 1 HIT, WAY 2 HIT, or WAY 3 HIT signals, MRU update circuitry 320 determines whether or not the way hit signal matches the predicted way value stored in MRU register 311 for that particular cache line. If the cache hit for that cache line occurred in one of the ways other than the MRU way, MRU update circuitry 3+r 320 modifies the value in MRU register 311 so that the way in which the cache hit occurred now becomes the new most recently used way for that cache line.

This results in an extra clock cycle being added to the cache line access operation.

If an incoming address A(11:5) is received and a cache miss occurs, such that none of the way hit signals goes active, a new cache line must be loaded from main memory into one of the ways in L1 cache 115. MRU update circuitry 320 uses the value in MRU register 311 to select one of the least recently used ways to receive the incoming cache line from main memory. The value in MRU register 311 is also modified so that the way into which the retrieved cache line from main memory is loaded now becomes the new most recently used way for that particular retrieved cache line.

A 16 Kbyte virtual victim cache according to the principles of the present invention has advantages over a two level cache consisting of a 4 Kbyte direct-mapped L1 cache backed by a conventional 12 Kbyte 3-way set associative L2 victim cache. The present invention has lower power since there is no copying of data between the L1 cache and the L2 cache. A virtual victim cache according to the principles of the present invention accomplishes the equivalent of copying by updating the most recently used (MRU) bits in the address decoder. The present invention has good performance in terms of the hit rate and access time and is potentially better because no time is wasted copying cache lines when there is a hit to a way other than the MRU way. Also, less die space is needed because there is no need for separate decoders and sense amplifiers for the L2 data array and no routing circuitry between two different arrays is required.

It is noted that the above-described embodiment of a 16 Kbyte 4-way set associative virtual victim cache is by way of illustration only. More generally speaking, the present invention may be embodied as an N-way cache of M Kbyte size, such that the virtual victim cache is equivalent to a M/N Kbyte direct-mapped L1 cache backed by a (M−M/N) Kbyte N−1 way set associative victim cache.

Although the present invention has been described in detail, those skilled in the art should understand that they can make various changes, substitutions and alterations herein without departing from the spirit and scope of the invention in its broadest form.

What is claimed is:

1. A cache memory comprising:
   N ways, where N is an integer greater than one, each of said N ways comprising a data array capable of storing L cache lines and a tag array capable of storing L address tags, each of said L address tags associated with one of said L cache lines; and
   address decoding circuitry capable of receiving an incoming memory address and accessing a target cache line corresponding to said incoming memory address only in a most recently used one of said N ways; and
   a register capable of storing a value for a cache line of the L cache lines, the resister comprising a first set of bits to identify a second set of bits of the register, where the second set of bits is to store a MRU value, wherein said MRU value indicates a most recently used way of at least a portion of the N ways for a memory address of said cache line.

2. The cache memory as set forth in claim 1 further comprising hit determination circuitry capable of receiving said incoming memory address and accessing an address tag corresponding to said incoming memory address in each tag array in each of said N ways and determining if a cache hit occurred in one of said N ways.

3. The cache memory as set forth in claim 1 wherein said address decoding circuitry uses said MRU value to access said target cache line in said most recently used way.

4. The cache memory as set forth in claim 3 wherein said register is disposed in said address decoding circuitry.

5. The cache memory as set forth in claim 4 further comprising update circuitry capable of modifying said value in said register in response to a determination by said hit determination circuitry that said cache hit occurred in a target one of said N ways other than said most recently used way.

6. The cache memory as set forth in claim 5 wherein said update circuitry modifies said value stored in said register to identify said target way as a new most recently used way.

7. The cache memory as set forth in claim 5 wherein said update circuitry is further capable of modifying said value stored in said register in response to a determination by said hit determination circuitry that a cache miss occurred.

8. The cache memory as set forth in claim 1, wherein said first set of bits is a single bit.

9. The cache memory as set forth in claim 1, wherein said register further comprises a third set of bits and a fourth set of bits, the first, third and fourth sets of bits being different sets of bits, wherein a value of the first set of bits identifies one of the third and fourth sets of bits as the second set of bits.

10. The cache memory as set forth in claim 9 wherein each of said first, second, and third set of bits have a single bit.

11. A cache memory comprising:
    N ways, where N is an integer greater than one, each of said N ways comprising a data array capable of storing L cache lines and a tag array capable of storing L address tags, each of said L address tags associated with one of said L cache lines;
    address decoding circuitry capable of receiving an incoming memory address and accessing a target cache line corresponding to said incoming memory address only in a most recently used one of said N ways;
    hit determination circuitry capable of receiving said incoming memory address and accessing an address tag corresponding to said incoming memory address in each tag array in each of said N ways and determining if a cache hit occurred in one of said N ways;
    a register capable of storing a most recently used (MRU) value identifying said most recently used way;
    wherein said address decoding circuitry is capable of using said MRU value to access said target cache line in said most recently used way;
    wherein said register is disposed in said address decoding circuitry; and
    update circuitry capable of modifying said MRU value in said register in response to a determination by said hit determination circuitry that said cache hit occurred in a target one of said N ways other than said most recently used way;
    wherein said update circuitry is further capable of modifying said MRU value in response to a determination by said hit determination circuitry that a cache miss occurred; and
    wherein said update circuitry modifies said MRU value after said cache miss occurred to identify a least recently used one of said N ways as a new most recently used way.

12. A processing system comprising:
    a plurality of bus devices capable of transferring data between one another;
    a bus interface unit for transferring data between said plurality of bus devices; and a data processor coupled to said bus interface unit and capable of transmitting data to and receiving data from said plurality of bus devices via said bus interface unit; and a cache memory associated with said data processor comprising:

N ways, where N is an integer greater than one, each of said N ways comprising a data array capable of storing L cache lines and a tag array capable of storing L address tags, each of said L address tags associated with one of said L cache lines; and address decoding circuitry capable of receiving an incoming memory address and accessing a target cache line corresponding to said incoming memory address only in a most recently used one of said N ways; and a register capable of storing a value for a cache line of the L cache lines, the register comprising a first set of bits to identify a second set of bits of the register, where the second set of bits is to store a MRU value, wherein said MRU value indicates a most recently used way of at least a portion of the N ways for a memory address of said cache line.

13. The processing system as set forth in claim 12 further comprising hit determination circuitry capable of receiving said incoming memory address and accessing an address tag corresponding to said incoming memory address in each tag array in each of said N ways and determining if a cache hit occurred in one of said N ways.

14. The processing system as set forth in claim 12 wherein said address decoding circuitry uses said MRU value to access said target cache line in said most recently used way.

15. The processing system as set forth in claim 14 wherein said register is disposed in said address decoding circuitry.

16. The processing system as set forth in claim 15 further comprising update circuitry capable of modifying said value stored in said register in response to a determination by said hit determination circuitry that said cache hit occurred in a target one of said N ways other than said most recently used way.

17. The processing system as set forth in claim 16 wherein said update circuitry modifies said value stored in said register to identify said target way as a new most recently used way.

18. The processing system as set forth in claim 16 wherein said update circuitry is further capable of modifying said value stored in said register in response to a determination by said hit determination circuitry that a cache miss occurred.

19. A processing system comprising:

a plurality of bus devices capable of transferring data between one another;

a bus interface unit for transferring data between said plurality of bus devices; and a data processor coupled to said bus interface unit and capable of transmitting data to and receiving data from said plurality of bus devices via said bus interface unit; and a cache memory associated with said data processor comprising:

N ways, where N is an integer greater than one, each of said N ways comprising a data array capable of storing L cache lines and a tag array capable of storing L address tags, each of said L address tags associated with one of said L cache lines;

address decoding circuitry capable of receiving an incoming memory address and accessing a target cache line corresponding to said incoming memory address only in a most recently used one of said N ways;

hit determination circuitry capable of receiving said incoming memory address and accessing an address tag corresponding to said incoming memory address in each tag array in each of said N ways and determining if a cache hit occurred in one of said N ways;

a register capable of storing a most recently used (MRU) value identifying said most recently used way;

wherein said address decoding circuitry is capable of using said MRU value to access said target cache line in said most recently used way;

wherein said register is disposed in said address decoding circuitry; and update circuitry capable of modifying said MRU value in said register in response to a determination by said hit determination circuitry that said cache hit occurred in a target one of said N ways other than said most recently used way;

wherein said update circuitry is further capable of modifying said MRU value in response to a determination by said hit determination circuitry that a cache miss occurred; and wherein said update circuitry modifies said MRU value after said cache miss occurred to identify a least recently used one of said N ways as a new most recently used way.

20. A method of operating a cache memory comprising N ways, where N is an integer greater than one, each of the N ways comprising a data array for storing L cache lines and a tag array for storing L address tags, each of the L address tags associated with one of the L cache lines, the method comprising the steps of:

receiving an incoming memory address;

accessing an address tag corresponding to the incoming memory address in each tag array in each of the N ways and determining if a cache hit occurred in one of the N ways; and accessing a target cache line corresponding to the incoming memory address only in the most recently used one of the N ways; and determining said most recently used one of the N ways by accessing a register that contains a most recently used (MRU) value for each cache line, a portion of the MRU value identifying a second portion of the MRU value, where the second portion identifies said most recently used one of the N ways from at least a portion of the N ways.

21. The method as set forth in claim 20 further comprising the steps of:

in response to a determination that the cache hit occurred in a target one of the N ways other than the most recently used way, designating the target way as the new most recently used way; and upon receipt of a next subsequent incoming memory address, accessing a second target cache line corresponding to the next subsequent incoming memory address only in the target way.

22. A system comprising:

a cache comprising N ways, where N is an integer greater than one, each of said N ways comprising a data array capable of storing a plurality of cache lines;

a register to store a most recently used (MRU) value identifying a most recently used one of the N ways;

update circuitry to modify a value stored in the register to identify a least recently used one of said N ways as a new most recently used way in response to a determination by a hit determination circuitry that a cache miss occurred.

23. The system of claim 22 further comprising:

a data processor coupled to said cache.

24. The system of claim 23 further comprising:

a plurality of bus devices capable of transferring data between one another; and a bus interface unit to transfer data between said plurality of bus devices.

25. The system of claim 24 further comprising:

address decoding circuitry capable of receiving an incoming memory address and accessing a cache line of the plurality of cache lines corresponding to said incoming memory address only in a most recently used one of said N ways.

26. The system of claim 22 wherein the register further comprises a first set of bits to identify a second set of bits of the register, where the second set of bits is to store the MRU value a cache line of the plurality of cache lines.

27. A method comprising:

receiving an incoming memory address;

determining whether a cache hit or a cache miss occurs in an N way cache, where N is an integer greater than 1, with respect to the incoming memory address; and modifying a most recently used value of a register to identify a least recently used way of the N way cache as a most recently used way in response to determining a cache miss occurred.

* * * * *

UNITED STATES PATENT AND TRADEMARK OFFICE
CERTIFICATE OF CORRECTION

PATENT NO. : 6,718,439 B1
DATED : April 06, 2004
INVENTOR(S) : Rajeev Jayavant

It is certified that error appears in the above-identified patent and that said Letters Patent is hereby corrected as shown below:

Column 7,
Line 53, please replace "the resister comprising" with -- the register comprising --

Signed and Sealed this

Third Day of August, 2004

JON W. DUDAS
*Acting Director of the United States Patent and Trademark Office*